(No Model.)
C. KILLGORE.
MACHINE FOR COMPRESSING DRY AND PLASTIC MATERIALS.
No. 276,828. Patented May 1, 1883.
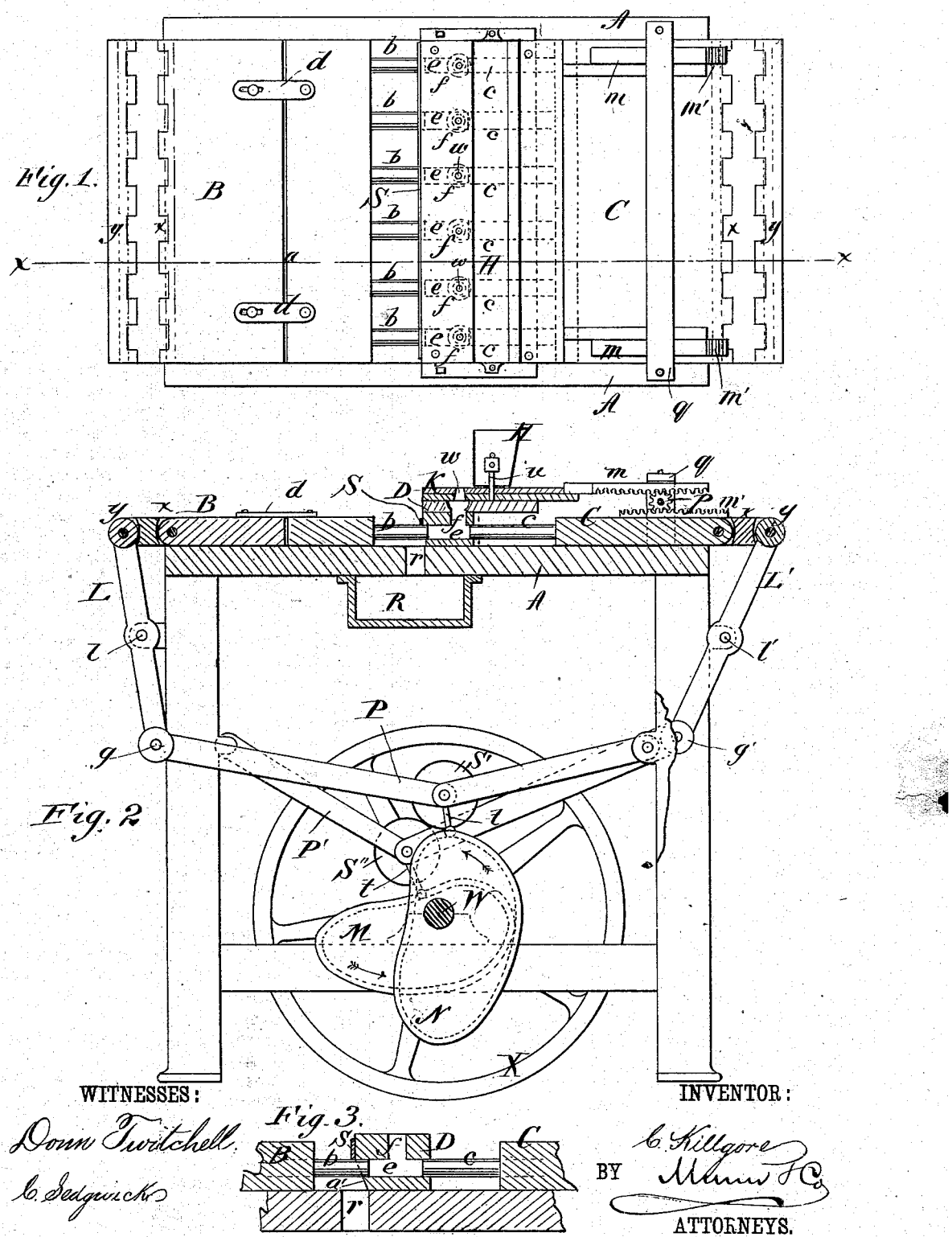
WITNESSES:  INVENTOR:
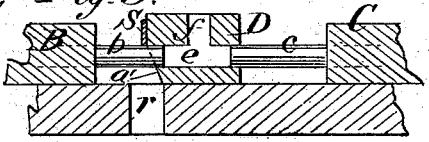

UNITED STATES PATENT OFFICE.

CHARLES KILLGORE, OF UTICA, NEW YORK, ASSIGNOR TO IDA W. KILLGORE, OF SAME PLACE.

MACHINE FOR COMPRESSING DRY AND PLASTIC MATERIALS.

SPECIFICATION forming part of Letters Patent No. 276,828, dated May 1, 1883.

Application filed August 22, 1882. (No model.)

*To all whom it may concern:*

Be it known that I, CHARLES KILLGORE, of Utica, in the county of Oneida and State of New York, have invented a new and improved Machine for Compressing Dry and Plastic Materials, of which the following is a full, clear, and exact description.

My invention consists of an arrangement of dies, molds, feeding and discharging apparatus, and operating gear, for automatically supplying the material to be compressed to the molds, compressing it between dies converging in the molds, removing the pressed material therefrom, and discharging it into a receptacle, the dies and molds being in multiple or gang arrangement, and the whole constructed and arranged for compressing any dry or plastic material in any form desired, as hereinafter fully described.

Reference is to be had to the accompanying drawings, forming part of this specification, in which similar letters of reference indicate corresponding parts in all the figures.

Figure 1 is a plan view of my machine. Fig. 2 is a sectional elevation on the line $x\,x$ of Fig. 1, and Fig. 3 is a detail section on a larger scale.

A represents the bed-plate or table, whereon die plates or stocks B and C are fitted to slide toward and from each other in suitable ways or guides, the stock B being provided with a series of plunger-dies, $b$, and stock C with a corresponding series of dies, $c$, to work in the horizontally-arranged molds $e$ of the mold-block D, into which molds the material to be pressed is supplied through vertical passages $f$ from a hopper, H, by the sliding plate $k$, having openings $w$, into which the material falls from the hopper when said openings are drawn back under said hopper, and from which it falls into the molds when they are shoved forward into the position represented in Fig. 1 and when the dies are drawn back.

When the molds are supplied with the material to be compressed the dies $c$ move forward to cut off the passages $f$. Then both sets of dies converge on the material to press it into the desired form. Then dies $b$ recede, and dies $c$, continuing to advance, push the pressed articles out of the molds, to be discharged through openings $r$ in the table A into any suitable receptacle, R.

S represents strippers attached to the mold-block D, and arranged with relation to dies $b$ so as to strip off or detach the pressed articles from the dies $b$ in case they stick to them, said strippers consisting of a rather stiff strip of rubber or equivalent material attached to the side of die-block D over dies $b$, with its lower edge bearing on them, so that it presses on the upper edges of the lozenges or other compressed articles and brushes them off when the dies $b$ withdraw from the molds for the discharge of the articles. The die-black D is made with an undercut bevel, $a'$, (see Fig. 3,) to facilitate the escape of the articles when thus brushed off.

The die-stock B is made in two sections, which join at $a$, and are connected by bars $d$, bolted onto them, and having slotted holes for the bolts of one end to enable thin liner-strips to be placed between them or removed therefrom to vary the dies for thicker or thinner articles to be pressed.

The two stocks B and C are connected by double-jointed bars $x\,y$ with levers L L', respectively, the said levers being pivoted to the frame of the machine at $l\,l'$, and lever L being connected with toggle-bars P, which are operated by cam N on the driving-shaft W and friction-roller S', and lever L' is connected to toggle-bars P', which are operated by cam M and friction-roller S'' to effect the compression of the material. The toggle-bars are connected to their respective cams by arms $t$, which have heads working in the grooves of the cams indicated by the dotted lines, Fig. 2, to positively retract the dies.

The feeding-plate $k$ is made in two parts for the purpose of placing thin strips between them to alter the height of the openings $w$ to vary the amount of material to be discharged into the molds. The opening $w$ is made tapering, with the larger diameter downward, to facilitate the discharge of the material and prevent sticking or lodging of same in the plate. The hopper H is attached so as to rise or fall on rods $u$ when the slide is changed. The slide $k$ is geared with the stock C by means of the racks $m\,m'$ and pinions $p$, these pinions being mounted on a shaft having bearings in the frame q, so that the slide is made to move back under the hopper to be charged when the stock C is moved forward to compress the charges previously delivered to the molds, and when the stock goes back the slide goes forward to deliver the charges to the molds. The cams M and N are constructed to cause the aforesaid movements of the dies, and the power is applied to the pulley X.

Having thus described my invention, what I claim as new, and desire to secure by Letters Patent, is—

1. The combination of the dies b and c, molds e, feeding-slide k, and hopper H, substantially as described.

2. The mold-block D, having molds e and filling-passages f, in combination with compressing-dies b and c, and cams M and N, and connecting devices, said cams being constructed and arranged to operate said dies for closing passages f, compressing the material, and discharging the same, substantially as described.

3. The feeding-slide k, in combination with hopper H and molds e, and being geared with the die-stock C by racks m m' and pinions p, substantially as described.

4. The die-stock B, constructed in two parts and adjustably connected for the application of liners, substantially as described.

5. The slide k, constructed in two parts, and combined with a hopper adapted to rise and fall for the application of liners between the parts of said slide, substantially as described.

6. Molds for compressing dry or plastic material, consisting of compressing chamber or space e and filling-passage f, said space e opening or extending through the mold-block for reception of the dies at each end and for the discharge of the pressed articles at one end, substantially as described.

7. The mold-block D, having the undercut bevel side a', in combination with the dies b and strippers s, substantially as described.

8. The toggle-bars P P' and rollers S' S', in combination with cams M N, and the die-operating levers L L', for connecting said cams and dies, substantially as described.

9. The toggle-levers P P', connected with the cams by arms t, having heads engaging grooves in the cams for positively retracting dies b c, substantially as described.

CHARLES KILLGORE.

Witnesses:
EDGAR TATE,
C. SEDGWICK.